(12) United States Patent
Matsuo et al.

(10) Patent No.: US 12,199,533 B2
(45) Date of Patent: Jan. 14, 2025

(54) POWER CONVERSION DEVICE

(71) Applicant: HITACHI ASTEMO, LTD., Hitachinaka (JP)

(72) Inventors: Kentaro Matsuo, Hitachinaka (JP); Kohei Myoen, Hitachinaka (JP); Kenichi Yoshida, Hitachinaka (JP); Kazuyoshi Aizawa, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 126 days.

(21) Appl. No.: 17/780,349

(22) PCT Filed: Nov. 13, 2020

(86) PCT No.: PCT/JP2020/042369
§ 371 (c)(1),
(2) Date: May 26, 2022

(87) PCT Pub. No.: WO2021/106609
PCT Pub. Date: Jun. 3, 2021

(65) Prior Publication Data
US 2023/0006586 A1 Jan. 5, 2023

(30) Foreign Application Priority Data

Nov. 29, 2019 (JP) .................. 2019-215991

(51) Int. Cl.
*H02P 21/00* (2016.01)
*H02P 21/18* (2016.01)
(Continued)

(52) U.S. Cl.
CPC .............. *H02P 21/18* (2016.02); *H02P 21/22* (2016.02); *H02P 27/06* (2013.01)

(58) Field of Classification Search
CPC .......... H02P 21/18; H02P 21/22; H02P 27/06; H02P 6/16; H02P 2207/05; H02P 29/60
See application file for complete search history.

(56) References Cited

U.S. PATENT DOCUMENTS

2020/0144948 A1    5/2020   Nishijima et al.

FOREIGN PATENT DOCUMENTS

| DE | 112021002455 T5 * | 2/2023 | .............. H02P 21/22 |
| JP | 2014-050122 A | 3/2014 | |

(Continued)

OTHER PUBLICATIONS

International Search Report with English translation and Written Opinion of International Application No. PCT/JP2020/042369 dated Feb. 22, 2021.

*Primary Examiner* — Karen Masih
(74) *Attorney, Agent, or Firm* — Foley & Lardner LLP

(57) ABSTRACT

A power conversion device includes: an inverter that converts a DC voltage into an AC voltage and drives a synchronous motor; and a magnetic pole position correction unit that corrects an error in a magnetic pole position of a rotor from a rotation angle sensor of the synchronous motor. The magnetic pole position correction unit includes an actual current phase calculation unit that calculates a current phase from a current when three-phase lines are short-circuited during rotation of the synchronous motor and an ideal current phase calculation unit that calculates an ideal current phase based on a rotational speed of the rotor and a temperature of a stator, and corrects the magnetic pole position from a difference between outputs of the actual current phase calculation unit and the ideal current phase calculation unit.

4 Claims, 7 Drawing Sheets

(51) Int. Cl.
 *H02P 21/22* (2016.01)
 *H02P 27/06* (2006.01)

(56) References Cited

FOREIGN PATENT DOCUMENTS

| | | |
|---|---|---|
| JP | 2014-176181 A | 9/2014 |
| JP | 2017-212783 A | 11/2017 |
| JP | 2023048833 A * | 4/2023 |
| WO | WO 2018/225139 A1 | 12/2018 |

* cited by examiner

POWER CONVERSION DEVICE

TECHNICAL FIELD

The present invention relates to a power conversion device.

BACKGROUND ART

When a system in which a permanent magnet synchronous motor is driven by an inverter is controlled, information on a magnetic pole position of a rotor with respect to a stator is required. In the case of an electric vehicle, the information on the magnetic pole position is acquired by a rotation angle sensor (resolver or the like) attached to the rotor to perform torque control of the motor, but torque different from a torque command value is generated when there is an angle error caused by an attachment error of the rotation angle sensor, which causes deterioration of drivability of the vehicle.

Therefore, it is necessary to estimate an actual rotor position of the permanent magnet synchronous motor and detect an offset error of the rotation angle sensor based on the estimated actual rotor position. Such conventional techniques are described in, for example, PTL 1 and PTL 2.

CITATION LIST

Patent Literature

PTL 1: JP 2014-050122 A
PTL 2: JP 2017-212783 A

SUMMARY OF INVENTION

Technical Problem

In the invention described in PTL 1, only a d-axis voltage is applied in a rotor stopped state, and an angle at which a q-axis current becomes zero is searched for. In this method, however, calibration of the magnitude of Vd and an energization time and the zero determination regarding the q-axis current are difficult, and it is difficult to sufficiently improve the accuracy.

The invention described in PTL 2 calculates an offset error based on a difference between a phase current detected in a state where a motor end is short-circuited and a phase current theoretical value. However, when a rotational speed is relatively low (for example, 1000 to 2000 rpm), an error caused by a motor temperature, particularly a stator temperature, is large, and it is difficult to sufficiently improve the accuracy.

An object that is to be achieved by the present invention is to detect an offset error of a rotation angle sensor of a rotor with high accuracy.

Solution to Problem

Therefore, a power conversion device according to the present invention includes: an inverter that converts a DC voltage into an AC voltage and drives a synchronous motor; and a magnetic pole position correction unit that corrects an error in a magnetic pole position of a rotor from a rotation angle sensor of the synchronous motor, the magnetic pole position correction unit including an actual current phase calculation unit that calculates a current phase from a current when three-phase lines are short-circuited during rotation of the synchronous motor, and an ideal current phase calculation unit that calculates an ideal current phase based on a rotational speed of the rotor and a temperature of a stator, and correcting the magnetic pole position from a difference between outputs of the actual current phase calculation unit and the ideal current phase calculation unit.

Advantageous Effects of Invention

The offset error of the rotation angle sensor of the rotor can be detected with high accuracy.

DESCRIPTION OF EMBODIMENTS

Hereinafter, a description will be given regarding embodiments of a power conversion device according to the present invention with reference to the drawings. Incidentally, the same elements will be denoted by the same reference signs in the respective drawings, and the redundant description thereof will be omitted.

First Embodiment

Figure 1:
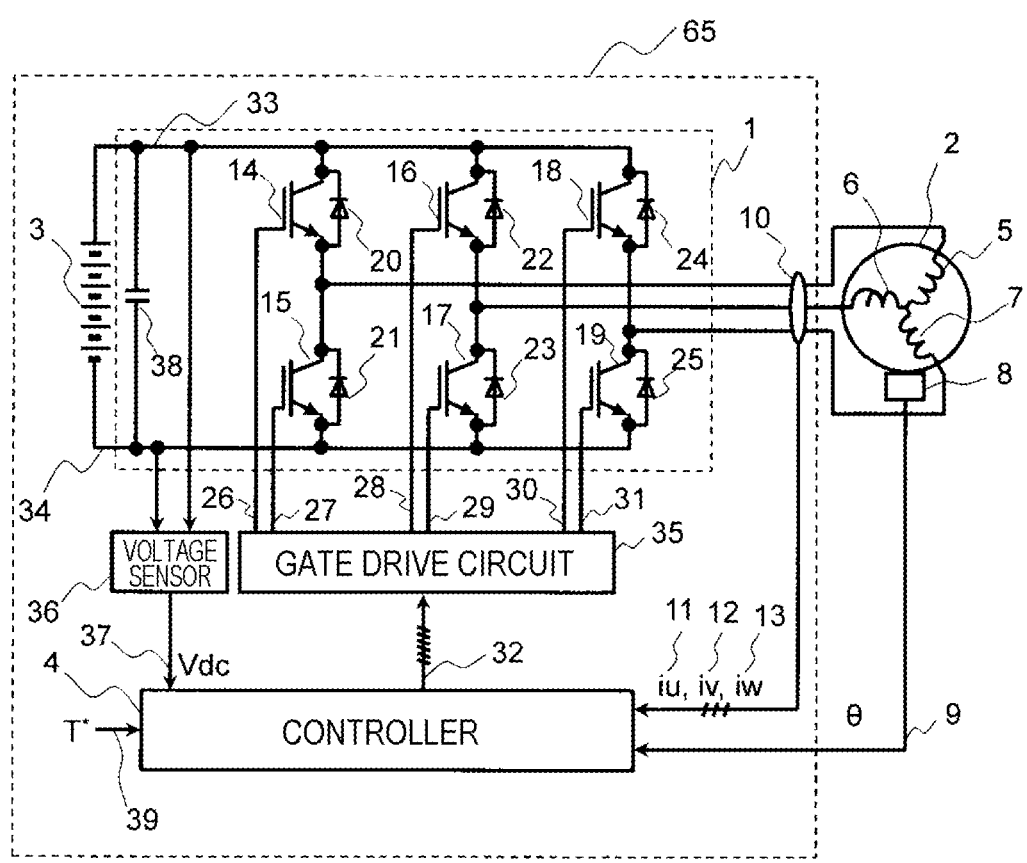
FIG. 1 is a diagram illustrating a schematic circuit configuration of a power conversion device.

FIG. 1 is a diagram illustrating a schematic circuit configuration of a power conversion device. In FIG. 1, the power conversion device of a motor 2 mainly includes an inverter 1, a battery 3, a controller 4, and the like. The inverter 1 is a three-phase voltage-type two-level inverter.

The motor 2 is connected to a drive mechanism of a motor vehicle system, and the motor 2 rotates to propel a vehicle. The motor 2 of the present embodiment is an AC motor, and is a three-phase interior permanent magnet synchronous motor (IPMSM). The motor 2 operates by an interaction between a magnetic flux generated from a permanent magnet provided in a rotor (not illustrated) and a magnetic field generated by currents iu, iv, and iw flowing through three-phase windings 5, 6, and 7 fixed to an armature. Here, iu, iv, and iw represent a U-phase current, a V-phase current, and a W-phase current, respectively. Note that a permanent magnet synchronous motor will be described in the present embodiment, but the present invention is also applicable to other synchronous motors such as a wound field synchronous motor.

The motor 2 includes a magnetic pole position sensor 8. The magnetic pole position sensor 8 has a function of detecting a magnetic pole position of the rotor of the motor 2 as a rotation angle. The magnetic pole position sensor 8 outputs a magnetic pole position signal 9 ($\theta$) to be input to the controller 4. Processing of the magnetic pole position signal 9 ($\theta$) in the controller 4 will be described later with reference to FIG. 2. The magnetic pole position sensor 8 can be configured using a resolver, a rotary encoder, an absolute encoder, or the like.

The current sensor 10 detects currents flowing through the windings 5, 6, and 7, outputs a U-phase current sensor signal 11 (signal indicating the current iu), a V-phase current sensor signal 12 (signal indicating the current iv), and a W-phase current sensor signal 13 (signal indicating the current iw) based on the detected currents to be input to the controller 4. Processing of the current sensor signals 11, 12, and 13 in the controller 4 will also be described later with reference to FIG. 2.

The inverter 1 includes switching elements 14, 15, 16, 17, 18, and 19 and freewheeling diodes 20, 21, 22, 23, 24, and 25. Each of the switching elements 14 to 19 of the present embodiment is a Si-IGBT and includes a gate terminal, a collector terminal, and an emitter terminal. Each of the freewheeling diodes 20 to 25 is connected between the collector terminal and the emitter terminal of each of the switching elements 14 to 19. When the collector terminal has a higher potential than the emitter terminal in each of the switching elements 14 to 19, each of the freewheeling diodes 20 to 25 prevents a current from flowing through the freewheeling diodes 20 to 25 and prevents a high reverse voltage from being applied to the switching elements 14 to 19. However, the present invention is not limited to the combination of the Si-IGBT and the freewheeling diode, and an inverter circuit may be configured using other semiconductor elements.

Switching of on and off of each of the switching elements 14 to 19 is performed by each of gate drive signals 26, 27, 28, 29, 30, and 31 connected to the gate terminals of the respective switching elements 14 to 19. Six gate signals 32 that are the basis of the gate drive signals 26 to 31 are generated by the controller 4 and output to a gate drive circuit 35. The gate drive circuit 35 converts the gate signals 32 into potentials necessary for switching the switching elements 14, 15, 16, 17, 18, and 19 between on and off, and outputs the gate drive signals 26, 27, 28, 29, 30, and 31. The generation of the gate signal 32 in the controller 4 will be described later with reference to FIG. 2.

The emitter terminal of the switching element 14 and the collector terminal of the switching element 15 are connected to each other, and the connection point thereof is connected to the winding 5 to allow the flow of the current iu. The emitter terminal of the switching element 16 and the collector terminal of the switching element 17 are connected to each other, and the connection point thereof is connected to the winding 6 to allow the flow of the current iv. The emitter terminal of the switching element 18 and the collector terminal of the switching element 19 are connected to each other, and the connection point thereof is connected to the winding 7 to allow the flow of the current iw. The collector terminals of the switching elements 14, 16, and 18 are connected to each other and connected to a high-potential DC wiring 33. Further, the emitter terminals of the switching elements 15, 17, and 19 are connected to each other and connected to a low-potential DC wiring 34.

As a result, the controller 4 turns on and off the switching elements 14, 15, 16, 17, 18, and 19 at appropriate timings based on the generated gate signals 32, and controls the currents iu, iv, and iw flowing through the windings 5, 6, and 7 to realize rotation control of the motor 2. The gate signal 32 is in a form of a pulse width modulation (PWM) signal such that the currents iu, iv, and iw are sinusoidal signals having phases different from each other by 120 degrees.

A voltage sensor 36 is connected to the high-potential DC wiring 33 and the low-potential DC wiring 34, and detects a potential difference therebetween. Since the potential difference between the high-potential DC wiring 33 and the low-potential DC wiring 34 is normally a high voltage of, for example, 100 V or more, the voltage sensor 36 generates a DC voltage sensor signal 37 (Vdc), converted into a low voltage detectable by the controller 4, and inputs the DC voltage sensor signal to the controller 4.

A smoothing capacitor 38 included in the inverter 1 is connected between the high-potential DC wiring 33 and the low-potential DC wiring 34. The smoothing capacitor 38 has a function of suppressing a pulsation of a DC voltage generated by each switching operation of the switching elements 14 to 19.

In the battery 3, a terminal on the high potential side of the battery 3 is connected to the high-potential DC wiring 33, and a terminal on the low potential side of the battery 3 is connected to the low-potential DC wiring 34. As a result, the battery 3 serves as a DC power supply that supplies power to the inverter 1 and the motor 2.

A torque command 39 (T*) given from a host controller of a vehicle, such as an electronic control unit (ECU), is input to the controller 4. The controller 4 performs torque control of the motor 2 based on the torque command 39 (T*). Further the controller 4 receives inputs of temperatures of a stator and the rotor of the motor 2 although not illustrated in FIG. 1. Although it is desirable that the temperatures of the stator and the rotor be detected by a temperature sensor, it may be configured to use temperatures estimated by a known method.

Figure 2:
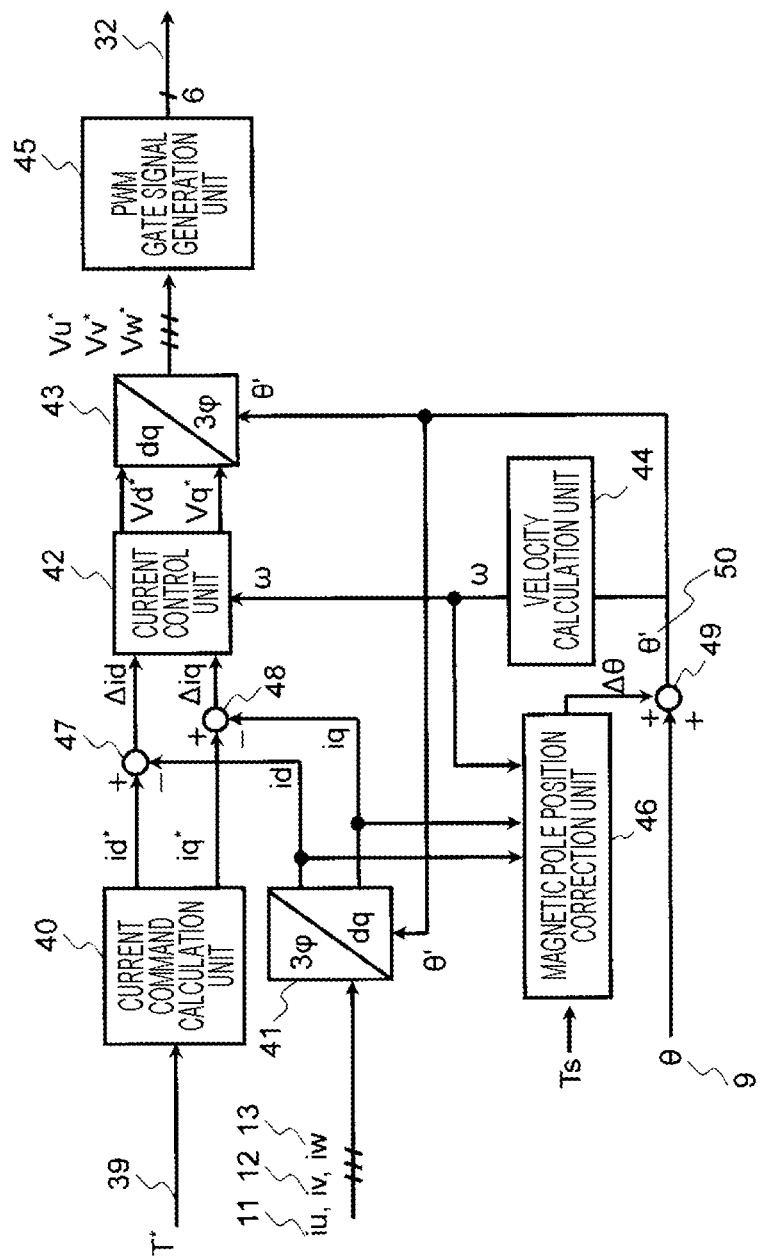
FIG. 2 is a processing block diagram for describing processing of a controller 4.

FIG. 2 is a processing block diagram for describing the processing of the controller 4.

In FIG. 2, processing blocks of the controller 4 include a current command calculation unit 40, a three-phase/two-phase conversion unit 41, a current control unit 42, a two-phase/three-phase conversion unit 43, a velocity calculation unit 44, a PWM gate control signal generation unit (control signal generation unit) 45, a magnetic pole position correction unit 46, a deviation calculator 47, a deviation calculator 48, and an adder 49. The current command calculation unit 40, the three-phase/two-phase conversion unit 41, the current control unit 42, the two-phase/three-phase conversion unit 43, the deviation calculator 47, and the deviation calculator 48 form a three-phase voltage command value generation unit. Normally, a three-phase voltage command value is generated based on the magnetic pole position signal 9 ($\theta$) detected by the magnetic pole position sensor 8. In the present invention, however, a corrected magnetic pole position signal 50 ($\theta'$) corrected by a method to be described later is used instead of the magnetic pole position signal 9 ($\theta$).

The controller 4 performs the rotation control by causing the three-phase currents iu, iv, and iw to flow through the motor 2. Inside the controller 4, a so-called current vector control method is used in which processing is performed in a coordinate system obtained by converting a three-phase fixed coordinate into a two-phase rotating coordinate represented by a d-axis and a q-axis.

The current command calculation unit 40 calculates a d-axis current command value id* and a q-axis current command value iq*. The torque command 39 (T*), a rotational angular velocity ω, and the DC voltage sensor signal 37 (Vdc) are input to the current command calculation unit 40, and the d-axis current command value id* and the q-axis current command value iq* are calculated from these inputs. The rotational angular velocity ω is calculated by the velocity calculation unit 44 based on the corrected magnetic pole position signal 50 (θ').

In a synchronous motor having magnetic saliency such as IPMSM, torque T is expressed by the following Formula (1) and depends on a current.

$$T = Pp \cdot \{\Phi + (Ld - Lq)id\} \cdot iq \tag{1}$$

In Formula (1), id is a d-axis current, iq is a q-axis current, Pp is the number of pole pairs, Ld is a d-axis inductance, Lq is a q-axis inductance, and Φ is a magnetic flux.

The corrected magnetic pole position signal 50 (θ') is input to the three-phase/two-phase conversion unit 41 and the two-phase/three-phase conversion unit 43, and is used for conversion between a two-phase coordinate and a three-phase coordinate of the d-axis and q-axis.

The three-phase/two-phase conversion unit 41 performs coordinate conversion on the current sensor signals 11 (iu), 12 (iv), and 13 (iw) into the d-axis and q-axis based on information on the corrected magnetic pole position signal 50 (θ'), and outputs a d-axis detection current id and a q-axis detection current iq.

The deviation calculator 47 calculates a deviation between the d-axis current command value id* output from the current command calculation unit 40 and the d-axis sensing current id output from the three-phase/two-phase conversion unit 41, and outputs a d-axis current deviation Δid to the current control unit 42. The deviation calculator 48 calculates a deviation between the q-axis current command value iq* output from the current command calculation unit 40 and the q-axis sensing current iq output from the three-phase/two-phase conversion unit 41, and outputs a q-axis current deviation Δiq to the current control unit 42.

The current control unit 42 performs feedback control such that the d-axis difference current Δid the q-axis current deviation Δiq each indicating a deviation between a command value that is a target value and a measured value that is an output value become zero, and calculates and outputs a d-axis voltage command Vd* and a q-axis voltage command Vq* as voltage commands in order to update the output values. The feedback control in the current control unit 42 is performed by, for example, PI control. The d-axis voltage command value Vd* and the q-axis voltage command value Vq* output from the current control unit 42 are input to the two-phase/three-phase conversion unit 43, thereby calculating and outputting three-phase voltage command values Vu*, Vv*, and Vw* based on the corrected magnetic pole position signal 50 (θ').

The PWM gate control signal generation unit (control signal generation unit) 45 compares the three-phase voltage command values Vu*, Vv*, and Vw* with a carrier wave (not illustrated) to generate the six gate signals 32, which are PWM signals, and outputs the gate signals to the gate drive circuit 35.

The magnetic pole position correction unit 46 is a characteristic portion of the present invention. The magnetic pole position correction unit 46 calculates an offset error Δθ caused by an attachment error of the magnetic pole position sensor 8. The calculated offset error Δθ is added to the magnetic pole position signal 9 (θ) detected by the magnetic pole position sensor 8, and is used to generate the three-phase voltage command value as the corrected magnetic pole position signal 50 (θ').

Figure 3:
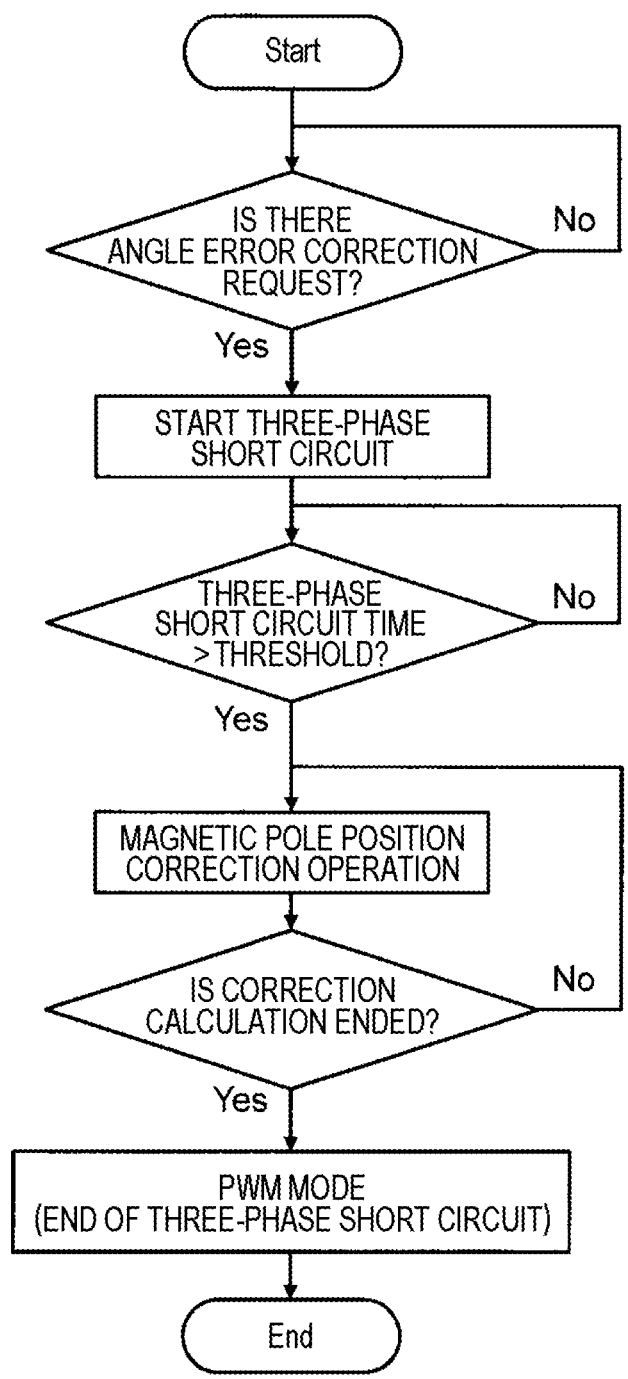
FIG. 3 is a flowchart illustrating a procedure of offset error calculation.

FIG. 3 is a specific procedure of the offset error calculation.

First, it is determined whether there is a request for angle error correction from the host controller. For example, as one execution example, the angle error correction is executed before product shipment after the magnetic pole position sensor 8 is assembled to the motor 2. In addition, the processing may be executed when the inverter 1 or the motor 2 is replaced, or may be executed when a decrease in output or torque of the motor 2 is detected. The host controller mounted on the vehicle outputs the angle error correction request when determining that the angle error correction according to the present invention can be executed from information on the rotational speed of the motor 2 and the like, for example.

When the angle error correction request is made from the host controller, a three-phase short circuit is started. The three-phase short circuit is a state where the switching elements 14, 16, and 18 constituting an upper arm of the inverter 1 are simultaneously turned on and the switching elements 15, 17, and 19 constituting a lower arm are simultaneously turned off, or a state where the switching elements 14, 16, and 18 constituting the upper arm are simultaneously turned off and the switching elements 15, 17, and 19 constituting the lower arm are simultaneously turned on.

Figure 4:
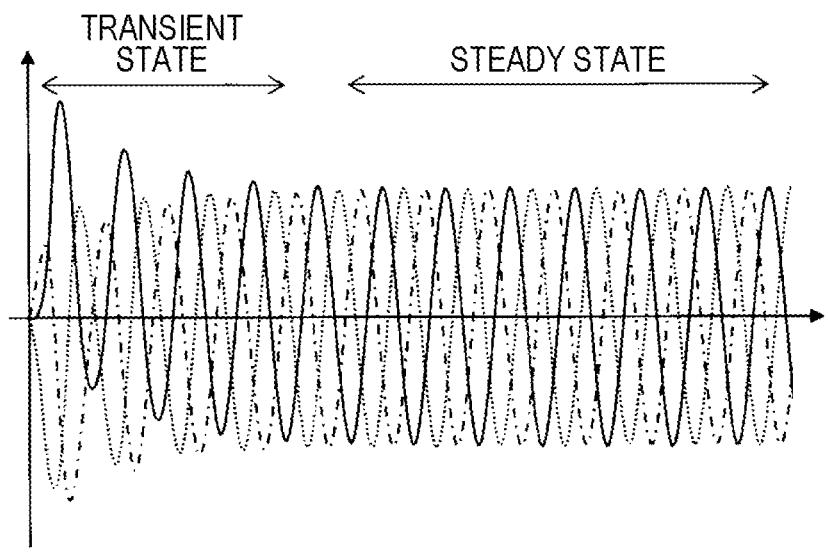
FIG. 4 is a view illustrating a waveform of each phase current after the start of a three-phase short circuit.

After the start of the three-phase short circuit, the processing stands by until a predetermined threshold time elapses. The reason therefor will be described with reference to FIG. 4. FIG. 4 illustrates current waveforms of the respective phases of U to W when the three-phase short circuit is started at certain time during the rotation of the motor 2. As illustrated in FIG. 4, the current waveforms varies in a transient state immediately after the start of the three-phase short circuit. In this state, the d-axis current and the q-axis current vibrate, and it is difficult to execute the magnetic pole position error correction accurately. Thus, this is because the magnetic pole position correction operation is executed after transition to a steady state where the variations of each phase current is settled.

The threshold time until the transition to the steady state can be calculated by characteristics of the motor 2. Time constants of the d-axis inductance Ld, the q-axis inductance Lq, and a stator resistance R in the motor can be expressed by 2Ld·Lq/{R (Ld+Lq)}.

Note that the determination until the transition to the steady state is performed by the comparison with the threshold time in the present embodiment, but the determination may be performed by another method, for example, a case where the amplitude of each phase current falls within a predetermined value range, a case where the vibration of the d-axis current id and the q-axis current iq falls below a predetermined threshold, or the like.

In FIG. 3, when a three-phase short circuit time exceeds the threshold, the magnetic pole position correction operation is executed. Details of the magnetic pole position correction operation will be described later with reference to FIG. 5. After the completion of the magnetic pole position correction operation, the three-phase short circuit is ended, and the processing returns to a normal PWM mode.

Figure 5:
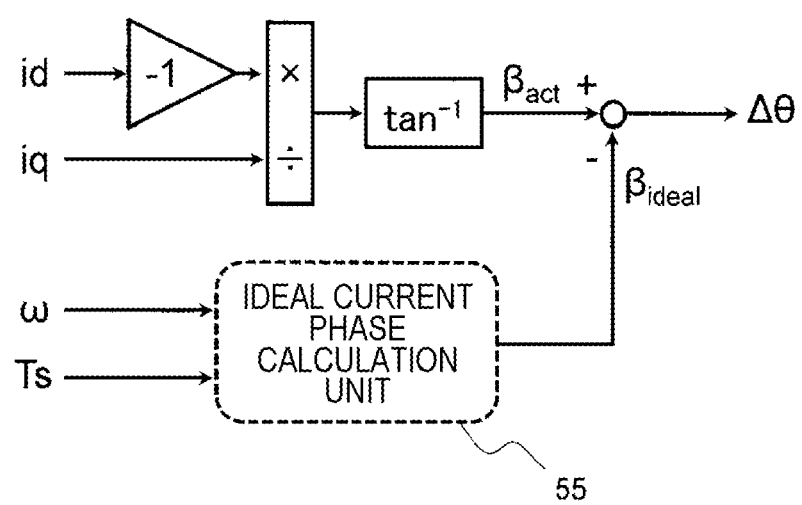
FIG. 5 is a block diagram illustrating a configuration of a magnetic pole position correction unit 46 according to a first embodiment.

FIG. 5 is a block diagram illustrating a configuration of the magnetic pole position correction unit 46 in the present embodiment. A procedure of the magnetic pole position correction operation in FIG. 3 will be described with reference to the block diagram of FIG. 5.

As described in FIG. 3, the magnetic pole position correction operation is executed at the time of the three-phase short circuit. First, dq conversion is performed on each phase current detected at the time of three-phase short circuit to calculate an actual current phase βact. The actual current phase βact at the time of the three-phase short circuit is expressed by Formula (2). The current phase has the q-axis at 0 degrees as a reference, and the counterclockwise direction thereof is positive.

$$\beta\text{act}=\tan^{-1}(-id/iq) \quad (2)$$

Further, the ideal current phase calculation unit 55 calculates an ideal current phase βideal based on the rotational speed (rotational angular velocity ω) of the motor 2 and a stator temperature Ts. The ideal current phase βideal at the time of the three-phase short circuit is expressed by Formula (3). Here, ω is an electrical angular velocity [rad/s], Lq is the q-axis inductance [H], and R is the stator resistance [Ω].

$$\beta\text{ideal}=\tan^{-1}(-\omega \cdot Lq/R) \quad (3)$$

Here, the ideal current phase βideal is a current phase in a case where there is no error in the magnetic pole position. The q-axis inductance Lq changes depending on the q-axis current, and the stator resistance R changes depending on the stator temperature. Meanwhile, the q-axis current hardly changes as long as the q-axis current is equal to or higher than a predetermined rotational speed (for example, 1000 rpm), and thus, the q-axis current can be regarded to be substantially constant. However, the stator resistance R depends on the temperature, and a resistance value also increases as the temperature increases. Therefore, the correction operation is performed using the stator temperature Ts in the present invention.

Figure 6:
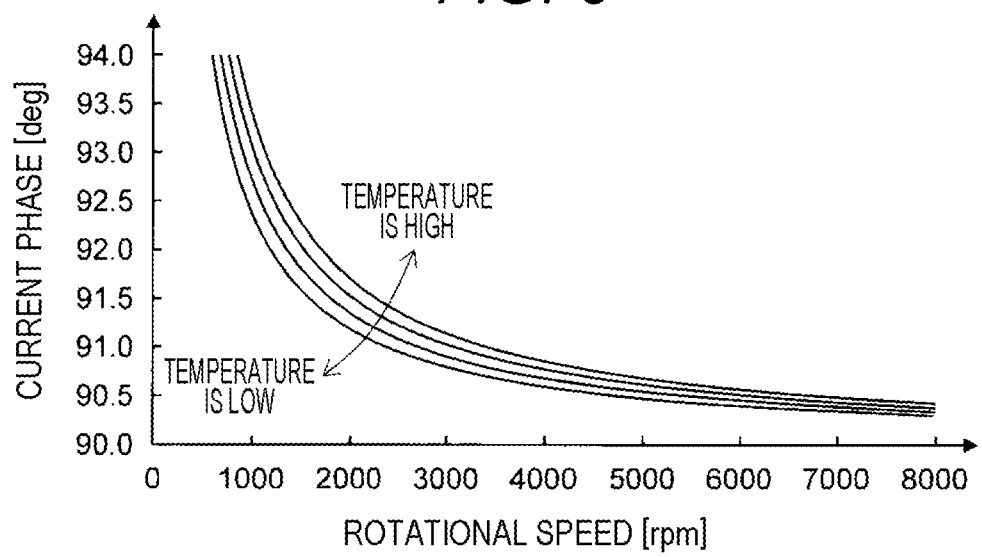
FIG. 6 is a graph illustrating a relationship between a rotational speed and an ideal current phase.

FIG. 6 is a graph illustrating a relationship between a rotational speed and an ideal current phase. The current phase on the vertical axis is indicated by a numerical value when the q-axis is set to 0 degrees as a reference. As illustrated in FIG. 6, a variation due to the temperature is large in a region where the rotational speed is relatively low, and an error in a case where the temperature is not corrected is large.

After the ideal current phase βideal is calculated in consideration of the influence of the stator temperature Ts as described above, a difference from the actual current phase βact is obtained. This difference corresponds to the offset error Δθ of the magnetic pole position sensor 8.

As described above, the power conversion device according to the present embodiment includes: the inverter that converts the DC voltage into the AC voltage and drives the synchronous motor; and the magnetic pole position correction unit 46 that corrects an error in a rotor magnetic pole position from the magnetic pole position sensor 8 of the motor 2. The magnetic pole position correction unit 46 includes an actual current phase calculation unit that calculates the current phase βact from the current when three-phase lines are short-circuited during rotation of the motor 2, and the ideal current phase calculation unit that calculates the ideal current phase βideal based on the rotational speed of the rotor and the temperature of the stator. Then, the magnetic pole position is corrected from the difference Δθ between outputs of the actual current phase calculation unit and the ideal current phase calculation unit.

As a result, the magnetic pole position can be obtained with high accuracy even in a low-speed region. In other words, the offset error can be corrected by a simple method according to the present invention, and thus, tolerance management at the time of assembling the magnetic pole position sensor can be simplified. Further, the current phase is directly obtained from the current value on the rotating coordinate in the magnetic pole position error correction in the present embodiment, and thus, the correction can be performed with a simple configuration as compared with a method of calculating an ideal current as three-phase currents on the fixed coordinates. Further, the offset angle is obtained by the three-phase short circuit currents, and thus, it is possible to perform the correction with high accuracy without being affected by an error caused by a dead time due to switching.

Note that the present embodiment is configured such that the highly accurate offset correction can be performed with fewer parameters by using the stator temperature Ts to calculate the ideal current phase. However, the use of other parameters is not precluded. For example, the ideal current phase may be calculated in consideration of not only the stator temperature but also the influence of a rotor temperature.

Figure 7:
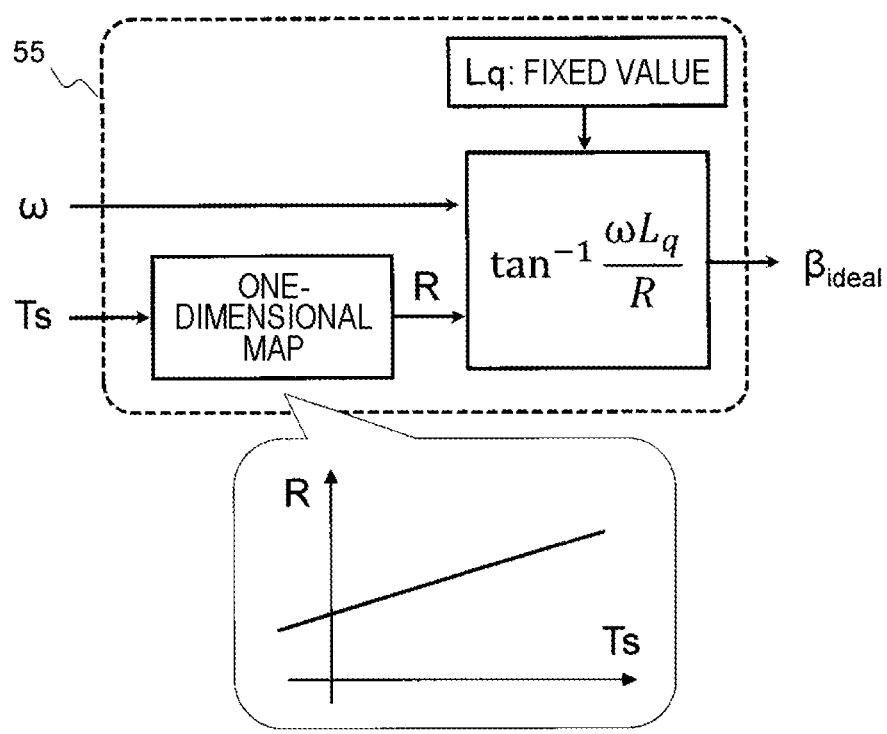
FIG. 7 is a block diagram illustrating a first modification of an ideal phase current calculation unit 55.
Figure 8:
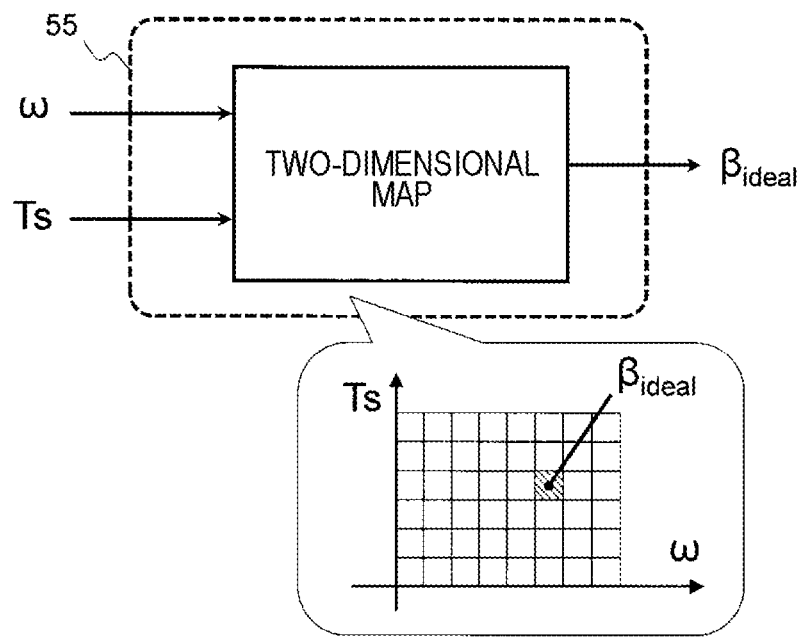
FIG. 8 is a block diagram illustrating a second modification of the ideal phase current calculation unit 55.

Next, modifications of the ideal current phase calculation unit in FIG. 5 will be described. A modification in FIG. 7 is an example using a one-dimensional map for calculating the stator resistance R from the stator temperature Ts. The stator resistance R obtained by the one-dimensional map, the q-axis inductance regarded as a constant value, and the rotor rotational speed (rotation speed ω) are used to calculate βideal=tan$^{-1}$(-ω·Lq/R). Further, in a modification of FIG. 8, a two-dimensional map or a table for the rotational speed and the stator temperature is stored, and the ideal current phase βideal is calculated with reference to the two-dimensional map. The two-dimensional map is created in advance by changing the stator temperature and speed and acquiring current phases with an actual machine.

Second Embodiment

In the present embodiment, a noise removal unit is further provided in addition to the configuration of the magnetic pole position correction unit 46 illustrated in FIG. 5. The other points are common to those of the first embodiment. Ideally, three-phase short circuit currents are three-phase symmetrical sinusoidal currents as illustrated in the steady state of FIG. 4. In practice, however, the current becomes a current in which noise is superimposed due to a variation in impedance of each phase, a spatial harmonic of an induced voltage, an error of a current sensor, or the like. Further, the dq-axis current vibrates even in a case where a complete steady state is not formed. Therefore, the noise removal unit is provided in the present embodiment to eliminate influence thereof and more accurate angle correction can be implemented. The noise removal unit removes noise by a first-order lag filter or an averaging process.

Figure 9:
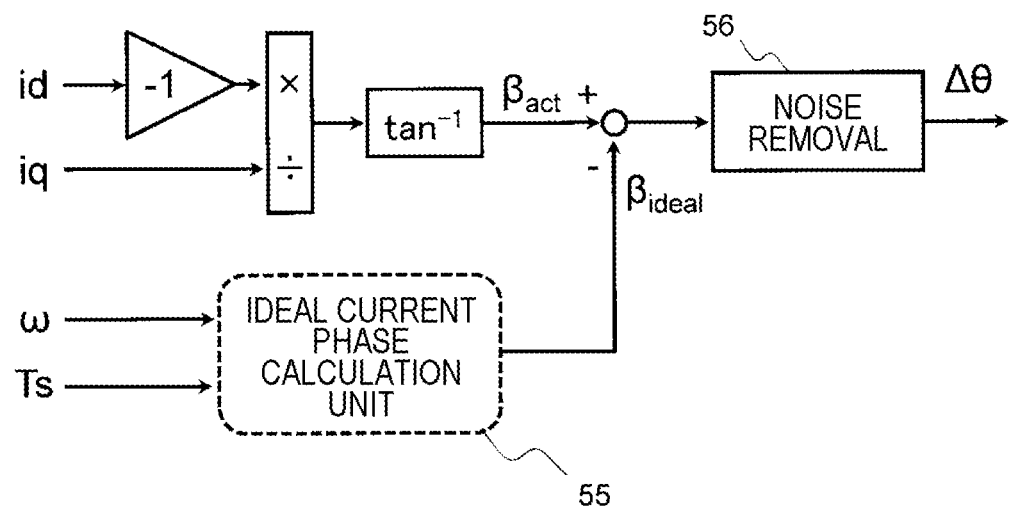
FIG. 9 is a block diagram illustrating a configuration of the magnetic pole position correction unit 46 according to a second embodiment.
Figure 10:
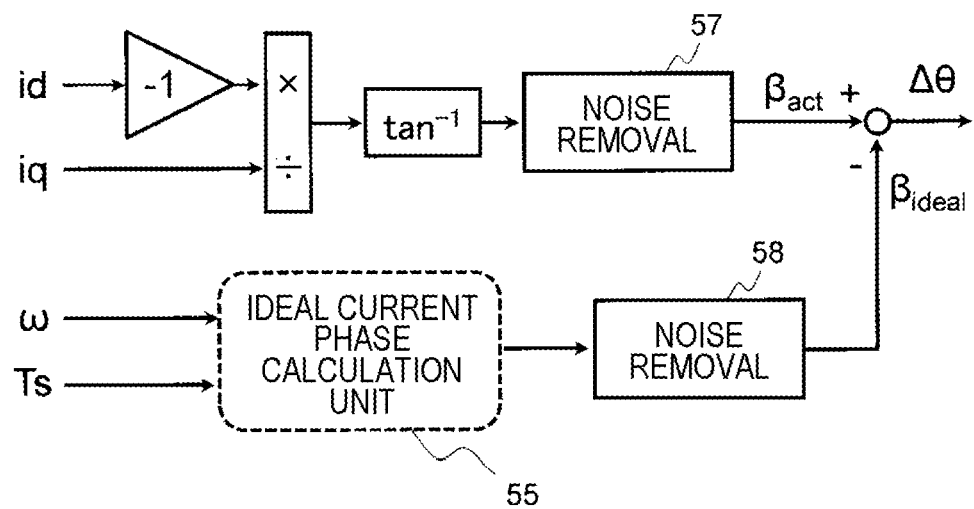
FIG. 10 is a block diagram illustrating a modification of the magnetic pole position correction unit 46 according to the second embodiment.

FIG. 9 is a block diagram in a case where a noise removal unit 56 is provided at a subsequent stage of a deviation calculation unit that obtains a deviation between the actual current phase βact and the ideal current phase βideal. Alternatively, noise removal units 57 and 58 may be provided at subsequent stages of an actual phase calculation unit and an ideal current phase calculation unit, respectively, as illustrated in FIG. 10.

REFERENCE SIGNS LIST 1 inverter
2 motor
3 battery
4 controller
5 to 7 three-phase winding
8 magnetic pole position sensor
9 magnetic pole position signal
10 current sensor
11 U-phase current sensor signal
12 V-phase current sensor signal
13 W-phase current sensor signal
14 to 19 switching element
20 to 25 IGBT
26 to 31 gate drive signal
32 gate signal
33 high-potential DC wiring
34 low-potential DC wiring
35 gate drive circuit
36 voltage sensor
37 DC voltage sensor signal
38 smoothing capacitor
39 torque command
40 current command calculation unit
41 three-phase/two-phase conversion unit
42 current control unit
43 two-phase/three-phase conversion unit
44 velocity calculation unit
45 PWM gate control signal generation unit (control signal generation unit)
46 magnetic pole position correction unit
47 deviation calculator
48 deviation calculator
49 adder
50 corrected magnetic pole position signal (θ')
55 ideal current phase calculation unit
56 to 58 noise removal unit
65 motor drive device (motor control device)

The invention claimed is:

1. A power conversion device comprising:
an inverter that converts a DC voltage into an AC voltage and drives a synchronous motor; and
a magnetic pole position correction unit that corrects an error in a magnetic pole position of a rotor from a rotation angle sensor of the synchronous motor,
wherein the magnetic pole position correction unit
includes an actual current phase calculation unit that calculates a current phase from a current when three-phase lines are short-circuited during rotation of the synchronous motor, and
an ideal current phase calculation unit that calculates an ideal current phase based on a rotational speed of the rotor and a temperature of a stator, and
corrects the magnetic pole position from a difference between outputs of the actual current phase calculation unit and the ideal current phase calculation unit.

2. The power conversion device according to claim 1, wherein
the magnetic pole position correction unit starts to operate after three-phase currents transition to a steady state after the short circuit among the three-phase lines.

3. The power conversion device according to claim 1, further comprising
a noise removal unit configured for a difference between the outputs of the actual current phase calculation unit and the ideal current phase calculation unit or calculated actual phase and ideal phase.

4. The power conversion device according to claim 1, wherein
the ideal current phase calculation unit calculates an ideal current phase based on the rotational speed of the rotor, the temperature of the stator, and a temperature of the rotor of the synchronous motor.

* * * * *